(12) United States Patent
Cheung et al.

(10) Patent No.: US 7,760,694 B2
(45) Date of Patent: Jul. 20, 2010

(54) DEVIATING FROM A TRANSMISSION MAP TO COMMUNICATE IN A WIRELESS NETWORK

(75) Inventors: David Cheung, Santa Clara, CA (US); Sathish K. Kumar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 11/458,476

(22) Filed: Jul. 19, 2006

(65) Prior Publication Data

US 2008/0032625 A1 Feb. 7, 2008

(51) Int. Cl.
*H04W 4/00* (2009.01)
(52) U.S. Cl. .................................................. 370/338
(58) Field of Classification Search ................ 370/336, 370/338
See application file for complete search history.

(56) References Cited

U.S. PATENT DOCUMENTS

| | | | | |
|---|---|---|---|---|
| 5,636,243 A * | 6/1997 | Tanaka | ..................... | 375/219 |
| 5,802,472 A * | 9/1998 | Taniguchi | .................. | 455/445 |
| 6,115,612 A * | 9/2000 | Fukuda | ...................... | 455/517 |
| 6,484,027 B1 * | 11/2002 | Mauney et al. | ............... | 455/421 |
| 7,133,398 B2 * | 11/2006 | Allen et al. | .................. | 370/350 |
| 7,190,686 B1 * | 3/2007 | Beals | ........................ | 370/337 |
| 7,251,235 B2 * | 7/2007 | Wentink | .................... | 370/338 |
| 7,286,842 B2 * | 10/2007 | Li et al. | ...................... | 455/502 |
| 7,339,923 B2 * | 3/2008 | Rogers | ...................... | 370/352 |
| 7,453,885 B2 * | 11/2008 | Rogers | ................... | 370/395.4 |
| 7,492,773 B2 * | 2/2009 | Hester et al. | ................ | 370/401 |
| 2002/0085520 A1 | 7/2002 | Sydon et al. | | |
| 2005/0286422 A1 * | 12/2005 | Funato | ...................... | 370/235 |
| 2007/0058605 A1 * | 3/2007 | Meylan et al. | ............. | 370/346 |
| 2007/0086370 A1 * | 4/2007 | Jang et al. | .................... | 370/318 |

FOREIGN PATENT DOCUMENTS

| | | |
|---|---|---|
| DE | 10 2004 033 651 B3 | 3/2006 |
| EP | 0 689 303 A1 | 12/1995 |
| EP | 0 726 690 A2 | 8/1996 |

* cited by examiner

*Primary Examiner*—Lester Kincaid
*Assistant Examiner*—Nathan Mitchell
(74) *Attorney, Agent, or Firm*—Schwabe, Williamson & Wyatt, P.C.

(57) ABSTRACT

Direct communication between devices in a wireless network without going through a base station is described herein. Such communication may be possible by deviating from a transmission map to be broadcasted by the base station of the wireless network.

19 Claims, 7 Drawing Sheets

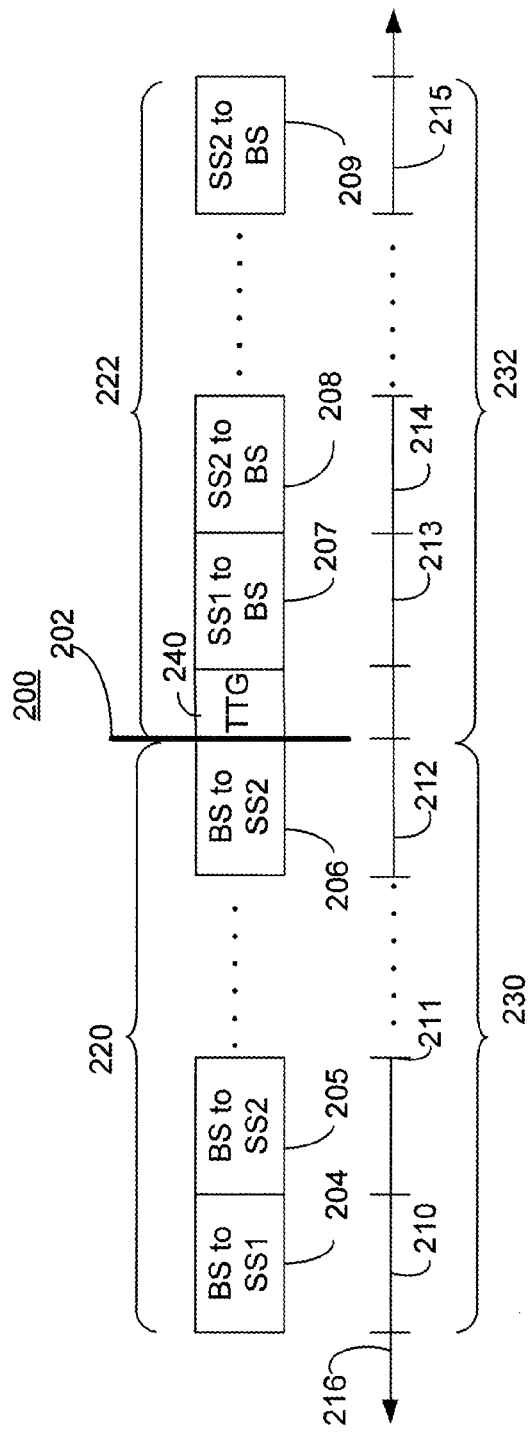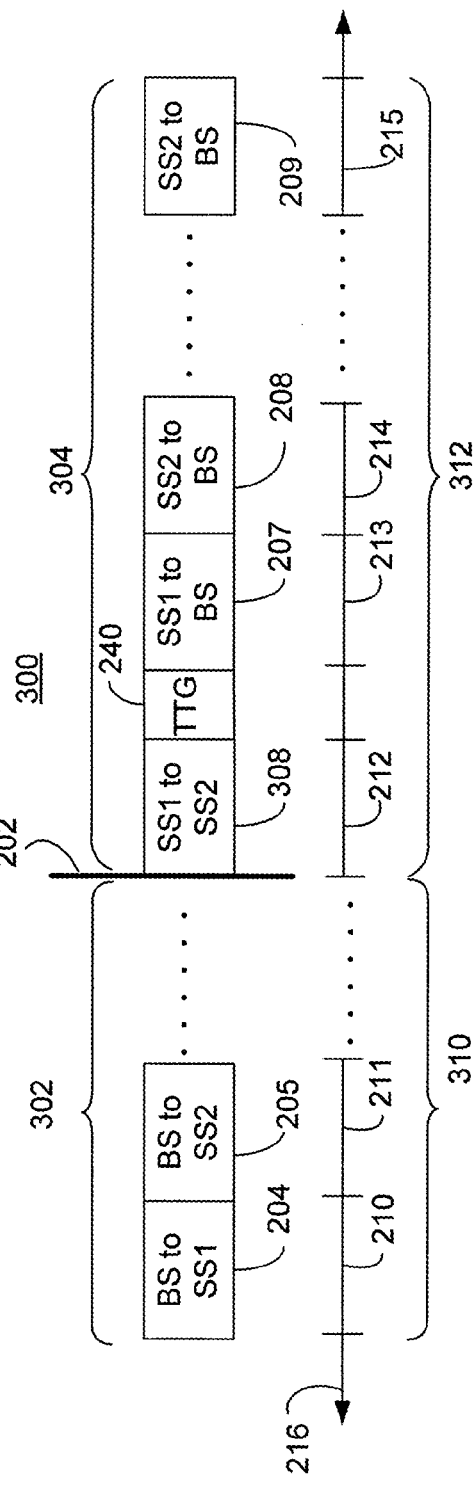

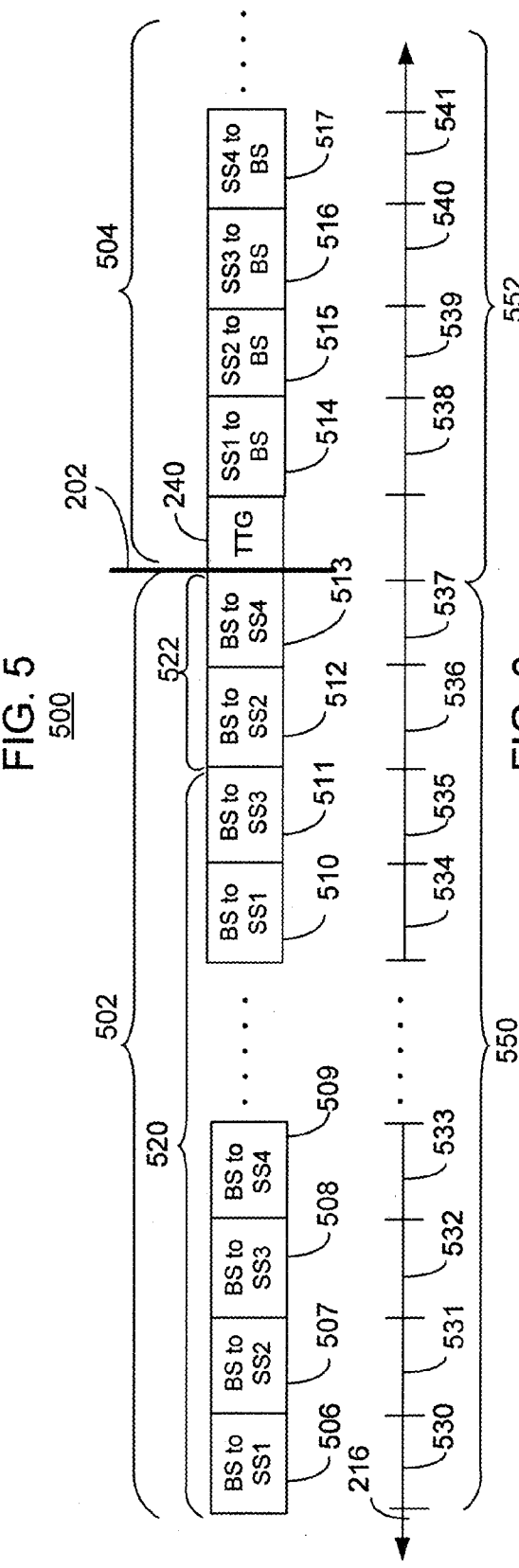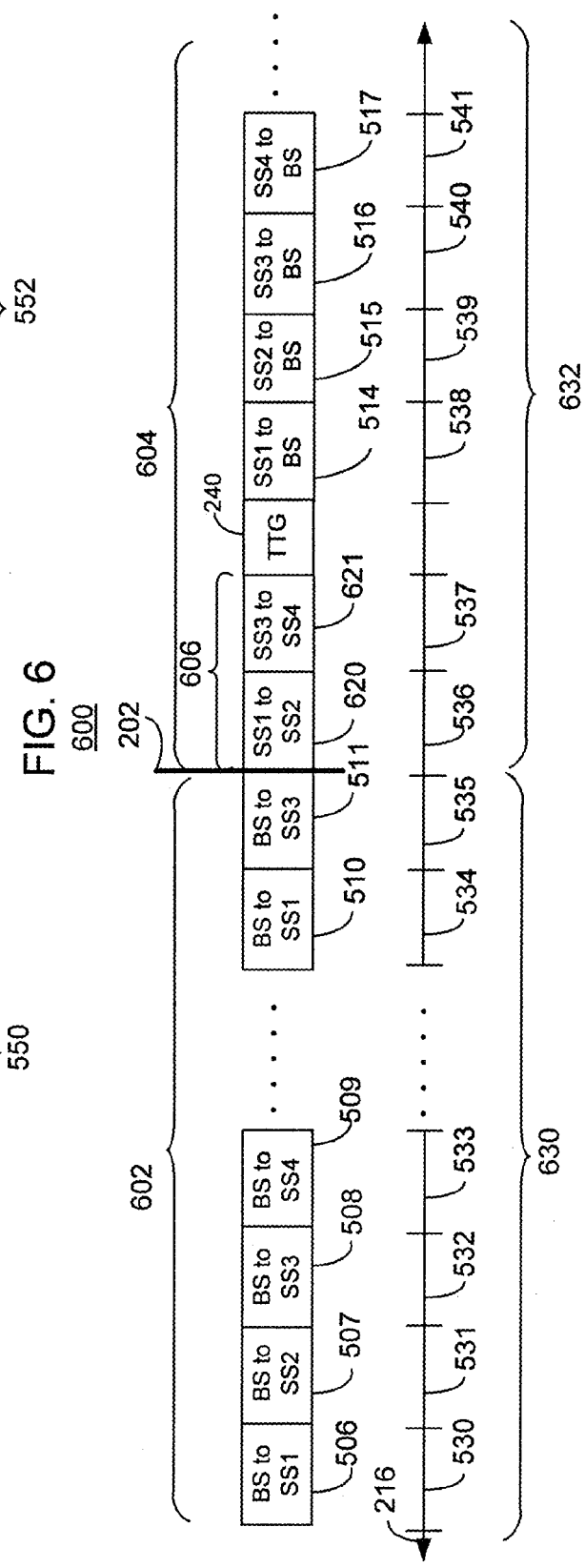

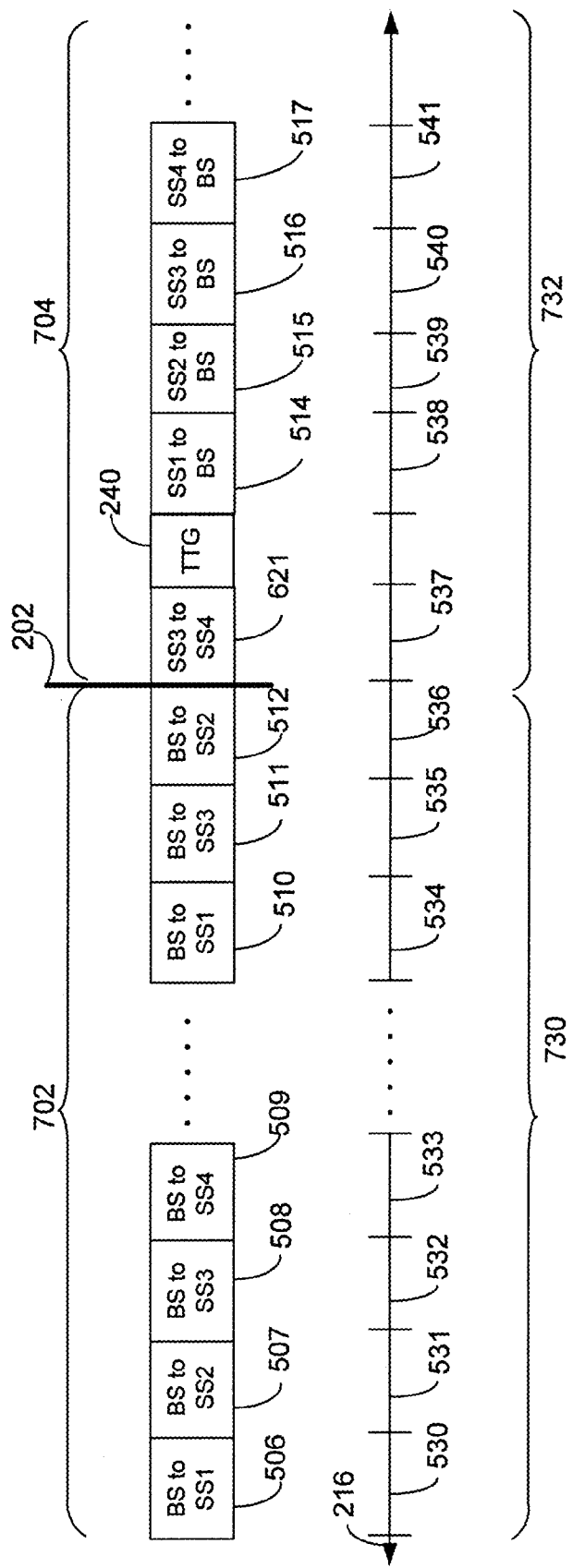

80

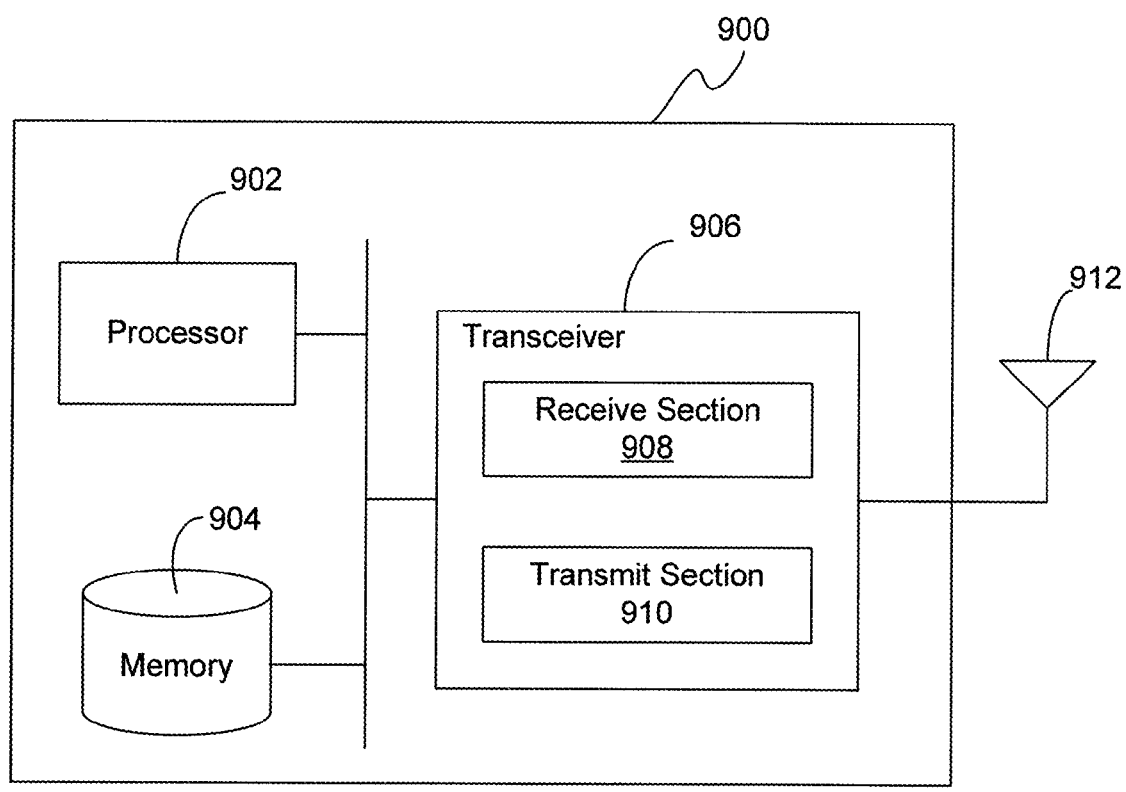

DEVIATING FROM A TRANSMISSION MAP TO COMMUNICATE IN A WIRELESS NETWORK

TECHNICAL FIELD

Embodiments of the present invention relate to the field of electronic communication, more specifically, to communication within wireless networks.

BACKGROUND

In some wireless networks, the nodes (e.g., base station and subscribers) of the networks will operate in accordance with transmission maps. A transmission map will typically specify a frame structure that indicates to a node at what points in time the base station can transmit signals to the subscribers and at what points in time each subscriber can transmit signals to the base station. An example of such a network is a WiMAX (i.e., Worldwide Interoperability for Microwave Access) network, in which the network nodes are configured and operate according to a standard such as one or more of the American National Standards Institute/institute of Electrical and Electronics Engineers (ANSI/IEEE) 802.16 standards (e.g., IEEE 802.16.2-2004 released Mar. 17, 2004) for metropolitan area networks (MANs), along with any updates, revisions, and/or amendments to such.

In a WiMAX network operating in the standard point-to-multipoint mode, a transmission map is broadcasted by the base station. Thus, each of the nodes will operate using the same common transmission map. In some WiMAX networks, time division duplex (TDD) may be employed such that each node is assigned time increments for transmitting or receiving signal bursts. Thus, based on the transmission map, each node will be assigned a specific point or points in time to transmit and receive signals.

One of the limitations of such a network is that subscribers of the network are typically unable to directly communicate with other subscribers of the network (that is, the subscribers are not able to directly transmit or receive signals from each other). In order for one subscriber to communicate with another subscriber, they must communicate with each other via the base station. As a result, communication within such networks can be somewhat limiting.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

FIG. 2 illustrates a frame structure in accordance with various embodiments of the present invention;

FIG. 3 illustrates a frame structure that is a modified version of the frame structure of FIG. 2 in accordance with various embodiments of the present invention;

FIG. 5 illustrates a frame structure in accordance with various embodiments of the present invention;

FIG. 6 illustrates a frame structure that is a modified version of the frame structure of FIG. 5 in accordance with various embodiments of the present invention;

FIG. 7 illustrates a frame structure that is another modified version of the frame structure of FIG. 5 in accordance with various embodiments of the present invention;

FIG. 9 illustrates a system in accordance with various embodiments of the present invention.

DETAILED DESCRIPTION OF ILLUSTRATIVE EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use the phrases "in various embodiments," or "in some embodiments," which may each refer to one or more of the same or different embodiments. Furthermore, the terms "comprising," "including," "having," and the like, as used with respect to embodiments of the present invention, are synonymous.

According to various embodiments of the present invention, a first device of a wireless network may directly communicate with a second device of the wireless network without having to communicate through a base station, wherein the first and second devices may be subscribers of the wireless network. For the embodiments, the base station may initially broadcast to the devices (i.e., subscribers) of the network a transmission map. The transmission map may specify a transmission frame structure having a first and a second subframe. The first subframe may be used for transmission of signals from a base station to the devices of the wireless network and the second subframe may be used for transmission of signals from the devices to the base station. The first and the second subframe may correspond to a first and a second transmission time interval, respectively, wherein the first transmission time interval ends before or at the start of the second transmission time interval. In order for the first device to transmit signals to a second device of the wireless network, the first device may deviate from the transmission map to transmit a signal to the second device during the first transmission time interval. These and other aspects will be described in greater detail below.

Figure 1:
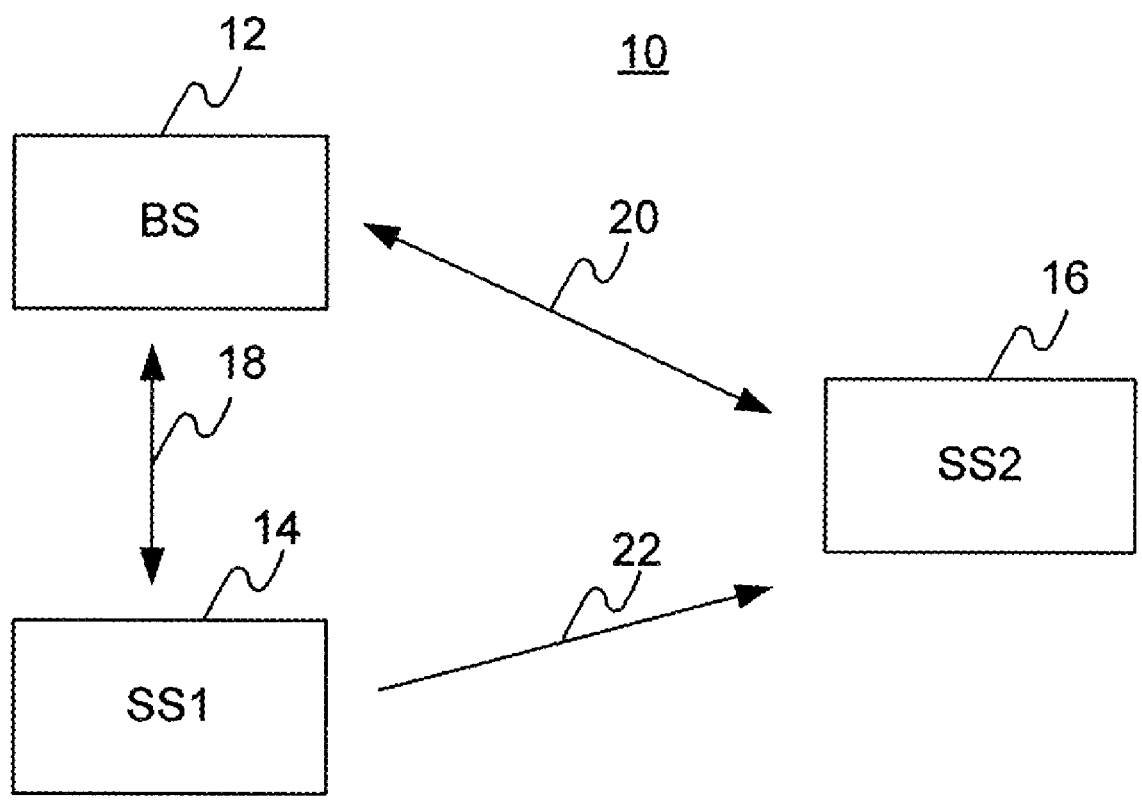
FIG. 1 illustrates a wireless network in accordance with various embodiments of the present invention.

FIG. 1 depicts a wireless network in accordance with various embodiments of the present invention. As illustrated, the network 10 includes three nodes: a base station (BS) 12, a first subscriber (SS1) 14, and a second subscriber (SS2) 16. In some embodiments, the network 10 may be a WiMAX network, and in particular, may be a point-to-multipoint (PMP) mode WiMAX network or a mesh mode WiMAX network. As illustrated, the first and the second subscribers 14 and 16 may bidirectionally communicate with the base station 12 as indicated by references 18 and 20. In addition, the first subscriber 14 may transmit signals or data to the second subscriber 16 as indicated by reference 22. For purposes of this description, this network 10 may be referred to as a cooperative network or system (herein "cooperative system") when the base station and first subscriber transmit simultaneously to the second subscriber.

FIG. 2 depicts an exemplary frame structure specified by a transmission map to be broadcasted by the base station 12 to the network 10 in accordance with various embodiments of the present invention. The frame structure 200 includes a first and a second subframe 220 and 222, the first subframe 220 being a downlink subframe for the base station 12 to transmit signals the subscribers 14 and 16, and the second subframe 222 being an uplink subframe for the subscribers 14 and 16 to transmit signals to the base station 12. Each of the subframes 220 and 222 is comprised of a plurality of bursts 204 to 209. Separating the first and the second subframes 220 and 222 is a bold line that for purposes of this description may be referred to as downlink/uplink (DL/UL) divider 202.

Also included at the beginning of the second subframe 222 is a transmit/receive transition gap (TTG) 240, which corresponds to a short period of time when no network device is allowed to transmit signals, allowing the base station 12 to switch from a transmission mode to a listen or reception mode. Similarly, the TTG 240 may allow the subscribers 14 and 16 to switch from a reception mode to transmission mode. Note that although in this illustration, the TTG 240 has been arbitrary included in the second subframe 222, alternatively, the TTG 240 may be included in the first subframe 220 as in the case of, for example, WiMAX networks. At the bottom of FIG. 2 is a timeline 216 segmented into time increments 210 to 215.

As previously described, the first (i.e., downlink) subframe 220 is for transmission of signals from the base station 12 to the subscribers 14 and 16 and includes bursts 204 to 206. In particular, burst 204 is for the base station 12 to transmit a signal to the first subscriber 14 and bursts 205 and 206 are for the base station 12 to transmit signals to the second subscriber 16. Note that within the first subframe 220, the base station 12 may, using multiple bursts, transmit signals to each of the subscribers 14 and 16 multiple times as indicated by the dotted line between burst 205 and burst 206, which is the last burst of the first subframe 220.

The first subframe 220 is associated with a first transmission time interval 230 comprising a plurality of time increments 210 to 212. In particular, each burst 204 to 206 is associated with a corresponding time increment 210 to 212, respectively.

The second (i.e., uplink) subframe 222 is for transmission of signals from the subscribers 14 and 16 to the base station 12 and includes bursts 207 to 209. In particular, burst 207 is for the first subscriber 14 to transmit a signal to the base station 12 and bursts 208 and 209 are for the second subscriber 16 to transmit signals to the base station 12. Within the second subframe 222, each of the subscribers 14 and 16 will have multiple opportunities to transmit signals to the base station 12 using multiple bursts as indicated by the dotted line between burst 208 and burst 209, which is the last burst in the second subframe 222.

The second subframe 222 is associated with a second transmission time interval 232 comprising a plurality of time increments 213 to 215. In particular, each burst 207 to 209 is associated with a corresponding time increment 213 to 215, respectively.

If the base station 12 operates in accordance with the frame structure 200 then the base station 12 may be in a transmission mode (may be configured to transmit signals but not for receiving signals) during the first transmission time interval 230 and may transition into a reception mode (may be configured to receive but not transmit signals) at the beginning of the second transmission time interval 232 (i.e., during the time period corresponding to TTG 240). In contrast, if each of the subscribers 14 and 16 operates in accordance with frame structure 200 then the subscribers 14 and 16 may be in a reception mode during the first transmission time interval 230 and may transition into a transmission mode at the start of the second transmission time interval 232 (i.e., at the DL/UL divider 202 or TTG 240).

However, according to various embodiments of the present invention, the first subscriber 14 may deviate from the "original" transmission map broadcasted by the base station 12 in order to transmit a signal to the second subscriber 16 during the first transmission time interval 230. This may be accomplished in some embodiments by having the first subscriber 14 operate in accordance with a new frame structure that is a modified version of the frame structure 200 specified by the original transmission map broadcasted by the base station 12. For these embodiments, this may mean that the first subscriber 14 modify the transmission map received from the base station 12. FIG. 3 depicts a modified frame structure 300 specified by the modified transmission map to be used by the first subscriber 14 to transmit a signal to the second subscriber 16 in accordance with various embodiments of the present invention. Once modified, the modified transmission map, in some embodiments, may be stored in memory such as a volatile or a persistent memory.

The new frame structure 300 may include a reduced first subframe 302 associated with a correspondingly reduced first transmission time interval 310 and an expanded second subframe 304 associated with a correspondingly expanded second transmission time interval 312. As illustrated, the reduced first subframe 302 is similar to the first subframe 220 of the original frame structure 200 depicted in FIG. 1 except that the reduced first subframe 302 having one less burst (i.e., burst 206) at the back-end of the reduced first subframe 302 than the first subframe 220 of the original frame structure 200. Likewise, the expanded second subframe 304 is similar to the second subframe 222 of the original frame structure 200 except that the expanded second subframe 304 has one more burst (i.e., 308) at the front-end (beginning) of the expanded second subframe 304 than the second subframe 222 of the original frame structure 200. In other words, the DL/UL divider 202 has been shifted one burst to the left in the new frame structure 300 such that the reduced first subframe 302 has one fewer burst (i.e., burst 206) while the expanded second subframe 304 has one more burst (i.e., burst 308). Although not depicted, a padding burst that allows network devices (e.g., first and second subscribers 14 and 16) to reconfigure themselves from a listen or reception mode to a transmission mode may be placed at the new location of DL/UL divider 202.

Note that burst 206, which is not included in the reduced first subframe 302, is the burst for the base station 12 to transmit a signal to the second subscriber 16 while burst 308, which has been added to the expanded second subframe 304, is a burst for the first subscriber 14 to transmit a signal to the second subscriber 16. In order for the first subscriber 14 to transmit a signal to the second subscriber 16, the first subscriber may operate in accordance with the new frame structure 300 of FIG. 3 while the base station 12 and the second subscriber 16 may operate in accordance with the original frame structure 200 of FIG. 2. As a result, the first subscriber 14 may transmit a signal to the second subscriber 16 during the expanded portion (i.e., burst 308) of the expanded second subframe 304.

It is noteworthy that since the base station 12 is operating in accordance with the original frame structure 200 and since the first subscriber 14 is operating in accordance with the new frame structure 300, both the base station 12 and the first subscriber 14 may "think" that time increment 212 is assigned to each of them for transmitting a signal to the second subscriber 16. As a result, both the base station 12 and the first subscriber 14 may transmit signals to the second subscriber 16 at the same time (i.e., during the same time increment 212), which may be allowed in the cooperative system (but may not be allowed in a relay network or system to be described below—see, for example, FIG. 8). Meanwhile, since the second subscriber 16 is operating in accordance with the original frame structure 200, it will "think" that the signal received from the first subscriber 14 during time increment 212 originated from the base station 12.

The ability for both the base station 12 and the first subscriber 14 to transmit signals to the second subscriber 16 at the same time may be allowed because the base station 12 and first subscriber 14 may transmit with an orthogonal space-time block code that may lead to improved wireless reception for the second subscriber 16. For example, if Alamouti space-time code is employed by the base station 12 and the first subscriber 14, and the second subscriber 16 uses a single antenna to receive the signals, the second subscriber 16 may experience improved diversity gain. Multiplexing gain is possible if the second subscriber 16 uses multiple antennas to receive the signals. If the second subscriber 16 uses a single antenna to receive the signals, the communication system is effectively multiple input single output (MISO). If the second subscriber 16 uses multiple antennas to receive, the communication system is effectively multiple input multiple output (MIMO).

Figure 4:
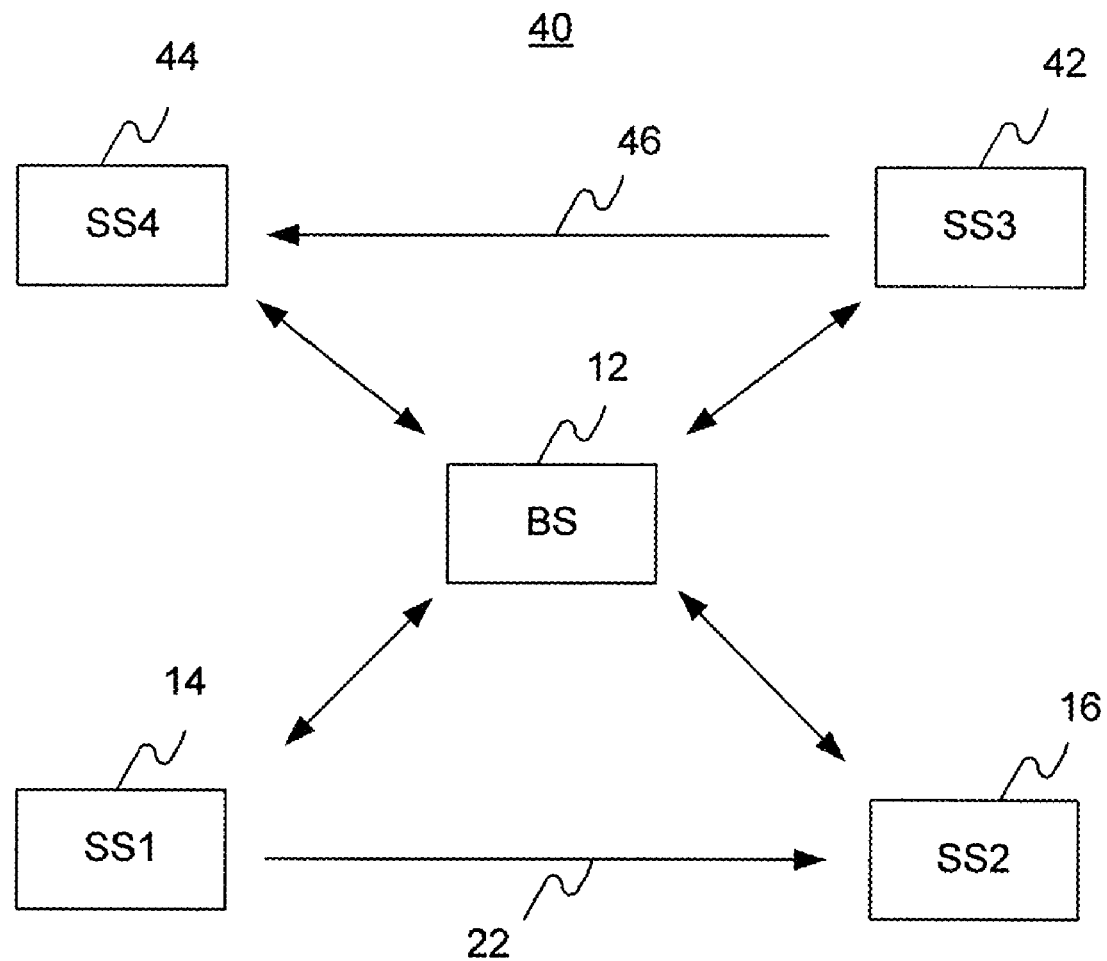
FIG. 4 illustrates a wireless network in accordance with various embodiments of the present invention.

FIG. 4 depicts another wireless network in accordance with various embodiments of the present invention. The network 40 is another cooperative system in which a first and a third subscriber 14 and 42 may transmit signals directly to a second and a fourth subscriber 16 and 44 without going through the base station 12 as indicated by references 22 and 46. As illustrated, all four subscribers 14, 16, 42, and 44 may also communicate bidirectionally with the base station 12 as in conventional wireless networks.

In order for each of the nodes of the network 40 to be able to communicate within the network 40, the base station 12 may initially broadcast to the network 40 a transmission map specifying a frame structure 500 as depicted in FIG. 5. The frame structure 500 includes a first (downlink) subframe 502 and a second (uplink) subframe 504 comprising a plurality of bursts 506 to 517. Each of the first and the second subframes 502 and 504 is associated with a first and a second transmission time interval 550 and 552, respectively. The first subframe 502 includes a plurality of bursts 506 to 513 for transmission of signals from the base station 12 to the subscribers 14, 16, 42, and 44 while the second subframe 504 includes a plurality of bursts 514 to 517 for transmission of signals from the subscribers 14, 16, 42, and 44 to the base station 12. Placed at the beginning of the second subframe 504 is a TTG 240. The first transmission time interval 550 includes a first set of time increments 530 to 537 while the second transmission time interval 552 includes a second set of time increments 538 to 541 along timeline 216, each of the time increments 530 to 541 corresponding to each of the plurality of bursts 506 to 517 of the first and second subframes 502 and 504, respectively. The plurality of bursts 506 to 513 of the first subframe 502 may be made up of a front-end subset of bursts 520 (i.e., bursts 506 to 511) associated with front-end time increments 530 to 535 and a back-end subset of bursts 522 (i.e., bursts 512 to 513) associated with back-end time increments 536 to 537.

After receiving the transmission map from the base station 12, the first and the third subscribers 14 and 42 may deviate from the transmission map broadcasted by base station 12 by transmitting signals to the second and fourth subscribers 16 and 44 during the first transmission time interval 550. In some embodiments, this may mean that the first and the second subscriber 14 and 42 operate in accordance with new frame structures that are modified versions of the original frame structure 500 that was specified by the transmission map broadcasted by the base station 12. The new frame structures may include a reduced first subframe having a correspondingly reduced first transmission time interval, and an expanded second subframe having a correspondingly expanded second transmission time interval as depicted in FIGS. 6 and 7. In particular, FIG. 6 depicts a modified frame structure 600 that the first subscriber 14 may operate in accordance with, according to various embodiments of the present invention. Note that in some instances, the third subscriber 42 may also operate in accordance with frame structure 600 as will be described below.

In some embodiments, the modified or new frame structure 600 may be derived by modifying the original transmission map broadcasted by the base station 12. The modification of the original transmission map may result in a reduced first subframe 602 and a correspondingly reduced first transmission time interval 630, and an expanded second subframe 604 having a correspondingly expanded second transmission time interval 632. In particular, the expanded second subframe 604 and the associated expanded second transmission time interval 632 may be as a result of expanding the second subframe 504 (and the second transmission time interval 552) of the original frame structure 500 and the reduced first subframe 602 and the associated reduced first transmission time interval 630 may be as a result of reducing the first subframe 502 (and the first transmission time interval 530) of the original frame structure 500, wherein the expansion of the second subframe 504 and the second time interval 532 is equal to the reduction of the first subframe 502 and the first transmission time interval 530. For example, in this case, the expanded portion 606 of the expanded second subframe 604 is substantially equal to the portion 522 of the first subframe 502 that is missing from the reduced first subframe 602.

The expansion of the second subframe 504 of the original frame structure 500 to produce the expanded second subframe 604 may be as a result of shifting the DL/UL divider 202 two bursts to the left. As a result, two bursts 512, and 513 (i.e., the back-end subset of bursts 522 associated with back-end time increments 536 to 537) for transmission of signals from the base station 12 to the second and fourth subscribers 16 and 44 are removed from the first subframe 502 to produce the reduced first subframe 602 (and associated reduced first transmission time interval 630) of the new frame structure 600. Correspondingly, two bursts 620 and 621 are added to the beginning of the second subframe 504 of the original frame structure 500 to produce the expanded second subframe 604 of the new frame structure 600. Note that bursts 506 to 511 that make up the reduced first subframe 602 corresponds to the same bursts that make up the front-end subset of bursts 520 of the first subframe 520 in the original frame structure 500.

Bursts 620 and 621, which were added to the second subframe 504 to form the expanded second subframe 604 of the new frame structure 600 includes a burst 620 for the first subscriber 14 to transmit a signal to the second subscriber 16 and a burst 621 for the third subscriber 42 to transmit a signal to the fourth subscriber 44. In alternative embodiments, however, the added burst 621 for the third subscriber 42 to transmit a signal to the fourth subscriber 44 (SS3 to SS4) may be replaced with a burst for the base station 12 to transmit a signal to the fourth subscriber 44 (see burst 513 of FIG. 5).

Although it was previously described that the third subscriber 44 may operate in accordance with frame structure 600, in other alternative embodiments, the third subscriber may operate in accordance with another frame structure 700 as depicted in FIG. 7. As illustrated, frame structure 700 is very similar to frame structure 600 of FIG. 6 except that the DL/UL divider 202 has only been shifted one burst to the left. As a result, only burst 513 (burst for transmission of signal from the base station 14 to the fourth subscriber 44) has been removed from the first subframe 502 of the original frame structure 500 to produce the reduced first subframe 702 (and associated reduced transmission time interval 730) of the new frame structure 700, and only burst 621 has been added to the second subframe 504 of the original frame structure 500 to produce the expanded second subframe 704 (and associated expanded transmission time interval 732) of the new frame structure 700.

Figure 8:
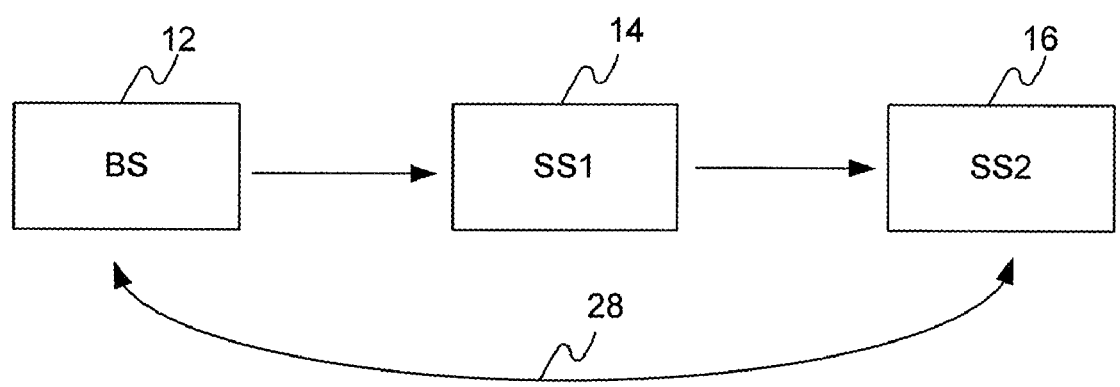
FIG. 8 illustrates a wireless network in accordance with various embodiments of the present invention.

FIG. 8 depicts another wireless network in accordance with various embodiments of the present invention. For purposes of this description, the network 80 may be referred to as a relay network or system (herein "relay system"). The network 80 includes a base station 12, a first subscriber 14, and a second subscriber 16. For the embodiments, the second subscriber 16 may receive signals from the base station 12 via the first subscriber 14, which may act as a relay station for the second subscriber 16. That is, although the second subscriber 16 may have the capability to bidirectionally communicate directly with base station 12 as indicated by reference 28, better data throughput rate may be achieved by employing a relay station (i.e., first subscriber 14) instead of directly communicating with the base station 12. This is because data throughput rates will generally diminish as the distance between a transmitting device (i.e., base station 12) and a receiving device (i.e., second subscriber 16) increases. Thus, by using a relay station (i.e., first subscriber 14) located somewhere between the base station 12 and the second subscriber 16 to relay signals from the base station 12 to the second subscriber 16, relatively high data throughput rate may be realized.

As before, the base station 12 may initially broadcast a transmission map to the network 80. The broadcasted transmission map may specify the frame structure 200 of FIG. 2. In order to relay a signal to the second subscriber 16, the first subscriber 14 may deviate from the frame structure 200 and transmit a signal to the second subscriber 16 during the first transmission time interval 230 similar to what was described previously for the cooperative system. In some embodiments, this may be accomplished by the first subscriber 14 modifying the original transmission map broadcasted by the base station 12. The resulting modified transmission map may specify a new modified frame structure 300 as depicted in FIG. 3, which the first subscriber 14 operates in accordance with, similar to the cooperative system described previously (see FIG. 1). However, unlike the cooperative system (i.e., network 10 of FIG. 1) in which the base station 12 operates in accordance with the original frame structure 200, the base station 12 in the relay system (as depicted in FIG. 8) may operate in accordance with the new frame structure 300. This is because in the relay system, the base station 12 may not be allowed to transmit a signal at the same time that the first subscriber 14 is transmitting a signal to the second subscriber 16. Thus, in order to make sure that the base station 12 has already transitioned from a transmission mode to a reception mode prior to the first subscriber 14 transmitting a signal to the second subscriber 16, the base station 12, like the first subscriber 14, may operate in accordance with the new frame structure 300.

In order for the base station 12 to perform these functions, the base station 12, in some embodiments, may include a physical storage medium, and a plurality of executable instructions stored in the physical storage medium, and designed to program the base station 12 to transmit a transmission map specifying a frame structure 200 to the wireless network 80. The frame structure 200 specified by the transmitted transmission map having a first and a second subframe 220 and 222. And if the base station 12 is operating in accordance with the transmitted transmission map, then the first subframe 220 may place the base station 12 into a transmission mode for transmitting signals to the subscribers 14 and 16 of the wireless network 80, and the second subframe 222 may place the base station 12 into a reception mode for receiving signals from the subscribers 14 and 16. The first and the second subframe 220 and 222 corresponding to a first and a second transmission time interval 230 and 232, the first transmission time interval 230 ending before or at the start of the second transmission time interval 232.

The plurality of executable instructions stored in the physical storage medium may further be designed to program the base station 12 to deviate from the transmission map to transition into the reception mode during the first transmission time interval 232. In some alternative embodiments, however, the above instructions may be remotely located to be wirelessly accessed when needed.

In some embodiments, in order to deviate from the transmission map, the base station 12 based on the executable instructions may operate in accordance with a new frame structure 300 that is a modified version of the original frame structure 200 with a reduced first subframe 302 having a correspondingly reduced first transmission time interval 310, and with an expanded second subframe 304 having a correspondingly expanded second transmission time interval 312. The expanded portions of the expanded second subframe 304 and the expanded second transmission time interval 312 (i.e., burst 308 and time increment 212) are equal to the portions deducted from the first subframe 220 and the first transmission time interval 230 (i.e., burst 206 and time increment 212 of FIG. 2) in order to form the reduced first subframe 302 and the reduced first transmission time interval 310. In some embodiments, the transition into the reception mode is at the beginning of the expanded portion of the expanded second transmission time interval 312. Note that the expanded second subframe 304 includes burst 308 for the first subscriber 14 to transmit a signal to the second subscriber 16 to relay a signal from the base station 12.

In various embodiments, burst 308, which is for the first subscriber 14 to transmit a signal to the second subscriber 16, includes data in the form of a preamble that facilitates the synchronization of the second subscriber 16 with the first subscriber 14. That is, burst 308 may include a preamble to facilitate the synchronization of the carrier oscillator of the second subscriber 16 with the carrier oscillator of the first subscriber 14 since the first subscriber 14 will be using an oscillator different from that of the base station 12 (i.e., the second subscriber 16 may be synchronized with the base station 12 but not with the first subscriber 14, thus the second subscriber will need to re-synchronized with the first subscriber 14).

FIG. 9 depicts a system in accordance with various embodiments of the present invention. For the embodiments, the system 900 may be adapted to receive a transmission map having a first subframe for transmission of signals from a base station of a wireless network to devices (i.e., subscribers) of the wireless network during a first transmission time interval, and a second subframe for transmission of signals from the devices of the wireless network to the base station during a second transmission time interval. The system 900 may be further adapted to deviate from the transmission map in order to transmit a signal to at least one of the devices of the network during the first transmission time interval. In some embodiments, the system 900 may be a subscriber of the wireless network having various form factors including, for example, a desktop computer, a laptop computer, a set-top box, a personal digital assistant (PDA), a web tablet, a pager, a text messenger, a game device, a smart appliance, a wireless mobile phone or any other type of computing or communication device.

As illustrated, the system 900 may host or include a processor 902 (i.e., controller), a memory 904 (which may include volatile and/or nonvolatile memory), a transceiver 906 that further includes a receive section 908 and a transmit section 910, and an antenna 912, coupled together as shown. In some embodiments, the antenna 912 may be an omnidirectional antenna. Alternatively, the antenna 912 may be a directional antenna or other types of antennas.

The receive section 908 may be adapted to receive for the system 900 hosting the receive section 908, a transmission map specifying a transmission frame structure, the transmission frame structure having a first and a second subframe, the first subframe for transmission of signals from a base station to devices of a wireless network and the second subframe for transmission of signals from the devices to the base station. In some embodiments, the first and the second subframes correspond to a first and a second transmission time interval, respectively, the first transmission time interval ending before or at the start of the second transmission time. The transmit section 910, in contrast, may be adapted to transmit for the host system 900 a signal to one of the devices of the wireless network during the first transmission time interval.

The processor 902 may provide transmit data to the transceiver 906 for generation of transmit signals by the transceiver 906, and to process receive data generated from receive signals received by the transceiver 906. The processor 902 may be further adapted to modify for the host system 900 the received transmission map to facilitate the host system 900 to transmit the signal. In alternate embodiments the modification may be performed by another controller (not shown) coupled to or embedded in transceiver 906. In some embodiments, the modified transmission map may be stored in memory 904. Modification of the receive transmission map may include reducing the first subframe having the first transmission time interval to a reduced first subframe having a correspondingly reduced first transmission time interval, and expanding the second subframe having the second transmission time interval to an expanded second subframe having a correspondingly expanded second transmission time interval. The processor 902 (or another controller) may further be adapted to control the transmit section 910 to transmit for the host system 900 the signal during the expanded portion of the expanded second transmission time interval based at least in part on the modified transmission map.

In some embodiments, wherein the first subframe comprises a first plurality of bursts associated with a first set of time increments of the first transmission time interval, and the second subframe comprises a second plurality of bursts associated with a second set of time increments of the second transmission time interval, the processor 902 (or another controller) may be adapted to modify for the host system 900 the received transmission map to reduce the first subframe to a reduced first subframe having a third plurality of bursts associated with a front-end subset of the first set of time increments. For the embodiments, the third plurality of bursts being less than the first plurality of bursts, and the reduced number of bursts corresponds to a back-end subset of the first set of time increments. The processor 902 (or another controller) may be further adapted to expand the second subframe for the host system 900 to an expanded second subframe having a fourth plurality of bursts, the fourth plurality of bursts being greater than the second plurality of bursts, the increased number of bursts and time increments corresponding to the reduced number of bursts and time increments.

In various embodiments, the ability for the transceiver 906 (i.e., receive and transmit sections 908 and 910) to operate as earlier described may be implemented with hardware integrated with the transceiver 906. In still other embodiments, the transceiver 906 may be implemented as separate transmitter and receiver.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method, comprising:
   receiving by a first device among a plurality of devices of a wireless network a transmission map specifying a transmission frame structure shared by the plurality of devices of the wireless network, the transmission frame structure having a first and a second subframe, the first and the second subframe corresponding to a first and a second transmission time interval, respectively, the first transmission time interval ending before or at the start of the second transmission time interval, the first and the second transmission time interval comprising a first set of time increments and a second set of time increments, respectively, and the first subframe for receiving signals transmitted from a base station to the plurality of devices of the wireless network and the second subframe for transmitting signals from the plurality of devices to the base station; and
   deviating by the first device from the transmission map by switching from a reception mode to a transmission mode during a time increment among the first set of time increments within the first transmission time interval wherein a second device among the plurality of devices is expected to receive a signal from the base station, and transmitting a signal from the first device directly to the second device in the time increment.
2. The method of claim 1, further comprising:

modifying by the first device the received transmission map to facilitate said transmission of a signal from the first device to the second device during the first transmission time interval; and storing the modified transmission map on the first device.

3. The method of claim 1, wherein said deviating comprises operating with a reduced first subframe having a correspondingly reduced first transmission time interval, and an expanded second subframe having a correspondingly expanded second transmission time interval, the expansion of the second subframe and the second transmission time interval being equal to the reduction of the first subframe and the first transmission time interval, and transmitting the signal to the second device during the expanded portion of the expanded second transmission time interval.

4. The method of claim 3, wherein said first subframe comprises a first plurality of bursts associated with the first set of time increments of the first transmission time interval, and the second subframe comprises a second plurality of bursts associated with the second set of time increments of the second transmission time interval; and the reduced first subframe has a third plurality of bursts associated with a front-end subset of the first set of time increments, the third plurality of bursts being less than the first plurality of bursts, the reduced number of bursts corresponding to a back-end subset of the first set of time increments, and the expanded second subframe has a fourth plurality of bursts, the fourth plurality of bursts being greater than the second plurality of bursts, the increased number of bursts and time increments corresponding to the reduced number of bursts and time increments.

5. The method of claim 4, wherein said reduction comprises removing a first burst from the first plurality of bursts, the first burst for transmission of a signal from the base station to the second device, and said expansion comprises adding a second burst to the second plurality of bursts, the second burst for transmission of a signal from the first device to the second device, wherein the first and the second burst are associated with a time increment.

6. The method of claim 5, wherein said reduction further comprises removing a third burst associated from the first plurality of bursts, the third burst for transmission of a signal from the base station to a third device of the wireless network, and said expansion further comprises adding a fourth burst to the second plurality of bursts for transmission of a signal from base station to a third device of the wireless network, wherein the third and fourth bursts are associated with another time increment.

7. The method of claim 4, wherein said reduction comprises removing a plurality of bursts and associated time increments at the back-end of the first time interval correspondingly from the first plurality of bursts and the first set of time increments, and the expansion comprises correspondingly adding a plurality of bursts and associated time increments to the second plurality of bursts and second set of time increments at the front-end of the second time interval.

8. The method of claim 7, wherein the added bursts and time increments correspondingly comprise a padding burst and an associated time increment, the padding burst being positioned at the front-end of the expanded second plurality of bursts to facilitate transition of the first device from a reception mode to a transmission mode.

9. The method of claim 1, wherein said transmitting from the first to the second device a signal comprises transmitting from the first device to the second device a signal to relay a signal received from the base station.

10. The method of claim 1, wherein said transmitting comprises transmitting from the first device to the second device a signal including data to synchronize the second device with the first device.

11. An article of manufacture, comprising:
a physical storage medium; and
a plurality of executable instructions stored in the physical storage medium, and designed to program a device of a wireless network to enable the device to:
transmit to other devices of the wireless network a transmission map specifying a transmission frame structure shared by the other devices of the wireless network, the transmission frame structure having a first and a second subframe, the first subframe for placing the device into a transmission mode for transmission of signals from the device to the other devices of the wireless network and the second subframe for placing the device into a reception mode for reception of signals from the other devices, the first and the second subframe corresponding to a first and a second transmission time interval, respectively, the first transmission time interval ending before or at the start of the second transmission time interval, the first and the second transmission time interval comprising a first set of time increments and a second set of time increments, respectively; and
deviate from the transmission map to transition the device from the transmission mode into the reception mode during a time increment among the first set of time increments within the first transmission time interval, the time increment originally designated for the device to transmit a signal to a first device among the other devices of the wireless network.

12. The article of manufacture of claim 11, wherein said executable instructions further designed to enable the device to:
modify the transmission map to facilitate said transition the device into the reception mode during the first transmission time interval; and
storing the modified transmission map in the device.

13. The article of manufacture of claim 12, wherein said deviate comprises operating with a reduced first subframe having a correspondingly reduced first transmission time interval, and an expanded second subframe having a correspondingly expanded second transmission time interval, the expansion of the second subframe and the second transmission time interval being equal to the reduction of the first subframe and the first transmission time interval, and said transition comprises transition into the reception mode at the beginning of the expanded portion of the expanded second transmission time interval.

14. An apparatus, comprising:
a receiver to receive for a device hosting the receiver, a transmission map specifying a transmission frame structure shared by devices of a wireless network, the transmission frame structure having a first and a second subframe, the first and the second subframe corresponding to a first and a second transmission time interval, respectively, the first transmission time interval ending before or at the start of the second transmission time interval, the first and the second transmission time interval comprising a first set of time increments and a second set of time increments, respectively, and the first subframe for receiving signals from a base station to the devices of the wireless network and the second subframe for transmission of signals from the devices to the base station;
a controller coupled to the receiver to modify for the host device the received transmission map by changing from a reception mode to a transmission mode during a time increment among the first set of time increments within the first transmission time interval wherein one of the devices is expected to receive a signal from the base station; and a transmitter to transmit for the host device a signal directly to the one of the devices of the wireless network during the time increment among the first set of time increments of the first transmission time interval in accordance with the modified transmission map.

15. The apparatus of claim 14, wherein said controller is adapted to modify for the host device the received transmission map to reduce the first subframe having the first transmission time interval to a reduced first subframe having a correspondingly reduced first transmission time interval, to expand the second subframe having the second transmission time interval to an expanded second subframe having a correspondingly expanded second transmission time interval, and the controller is coupled to the transmit section to control the transmit section to transmit for the host device a signal to one of the devices of the wireless network during the expanded portion of the expanded second transmission time interval based at least in part on the modified transmission map.

16. The apparatus of claim 15, wherein said first subframe comprises a first plurality of bursts associated with a first set of time increments of the first transmission time interval, and the second subframe comprises a second plurality of bursts associated with a second set of time increments of the second transmission time interval; and the controller is adapted to modify for the host device the received transmission map to reduce the first subframe to a reduced first subframe having a third plurality of bursts associated with a front-end subset of the first set of time increments, the third plurality of bursts being less than the first plurality of bursts, the reduced number of bursts corresponds to a back-end subset of the first set of time increments, and to expand the second subframe to an expanded second subframe having a fourth plurality of bursts, the fourth plurality of bursts being greater than the second plurality of bursts, the increased number of bursts and time increments corresponding to the reduced number of bursts and time increments.

17. A system, comprising:
an omnidirectional antenna;
a transceiver coupled to the antenna to selectively transmit into, and receive signals from a wireless network; and
a processor coupled to the transceiver to provide transmit data for generation of the transmit signals, and to process receive data generated from the receive signals;
wherein the transceiver is operated to receive a transmission map specifying a transmission frame structure shared by devices of the wireless network, the transmission frame structure having a first and a second subframe, the first subframe for reception of signals transmitted from a base station to the devices of the wireless network and the second subframe for transmission of signals from the devices to the base station, the first and the second subframe corresponding to a first and a second transmission time interval, respectively, the first transmission time interval ending before or at the start of the second transmission time interval, the first and the second transmission time interval comprising a first set of time increments and a second set of time increments, respectively; and
deviating from the transmission map by transmitting a signal to one of the devices of the wireless network directly during a time increment among the first set of time increments of the first transmission time interval wherein the one of the devices of the wireless network is expected to receive a signal from the base station.

18. The system of claim 17, wherein said processor is adapted to modify the received transmission map to facilitate the transmission of the signal to the other device during the first transmission time interval, and the system further comprising a memory coupled to the processor and the transceiver to store said modified transmission map.

19. The system of claim 17, wherein the system is one selected from the group consisting of a desktop computer, a laptop computer, a set-top box, a personal digital assistant (PDA), a web tablet, a pager, a text messenger, a game device, a smart appliance, or a wireless mobile phone.

* * * * *